J. L. PFLUEGER.
PARACHUTE AND LAUNCHING DEVICE FOR AEROPLANES.
APPLICATION FILED JULY 30, 1919.
1,327,355.
Patented Jan. 6, 1920.
4 SHEETS—SHEET 4.
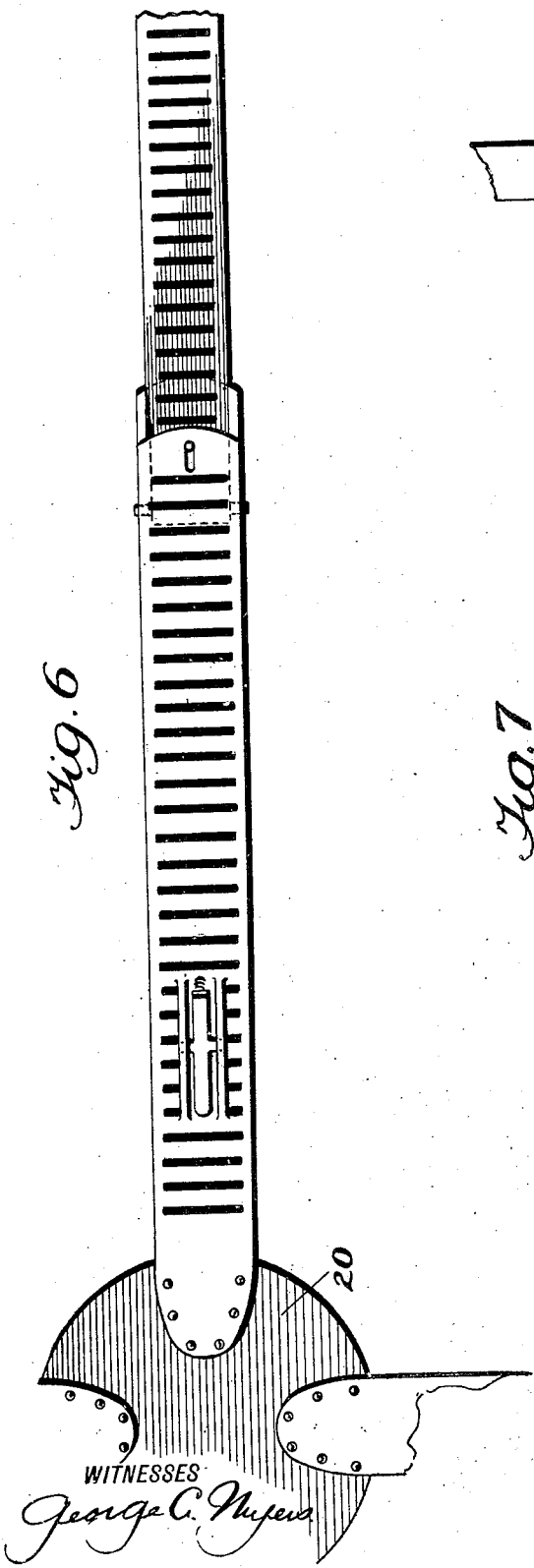
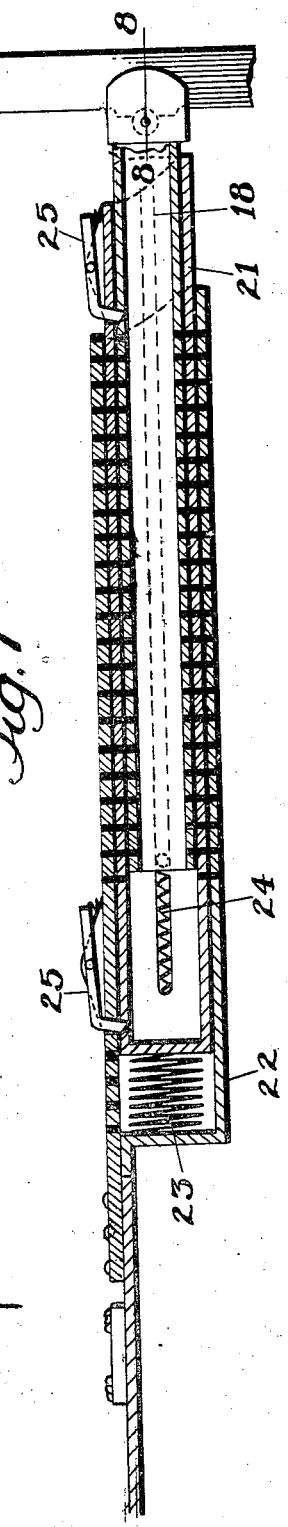
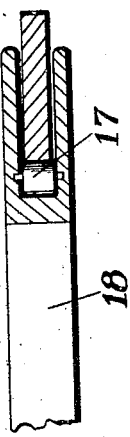
INVENTOR
J. L. Pflueger
BY
ATTORNEYS

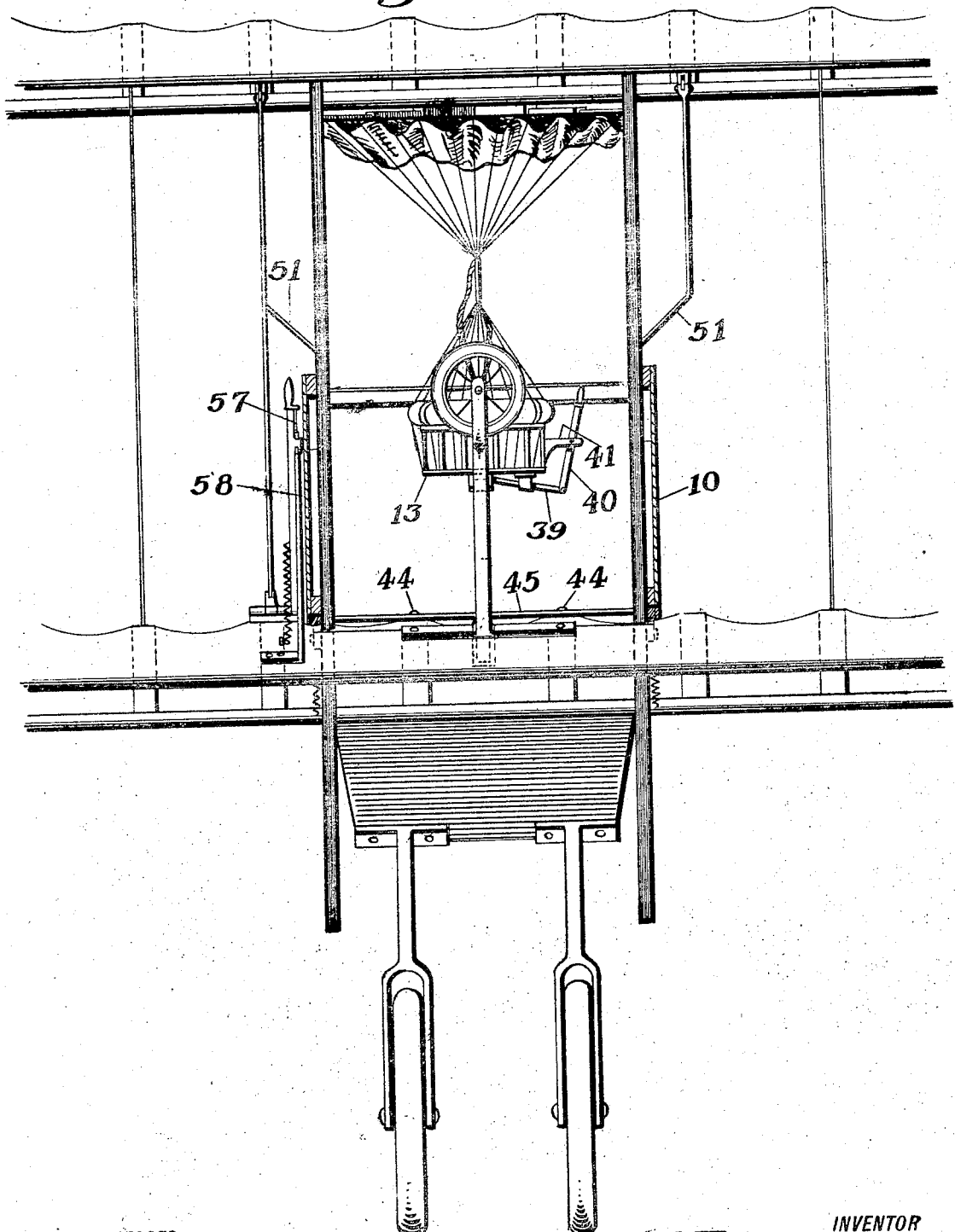

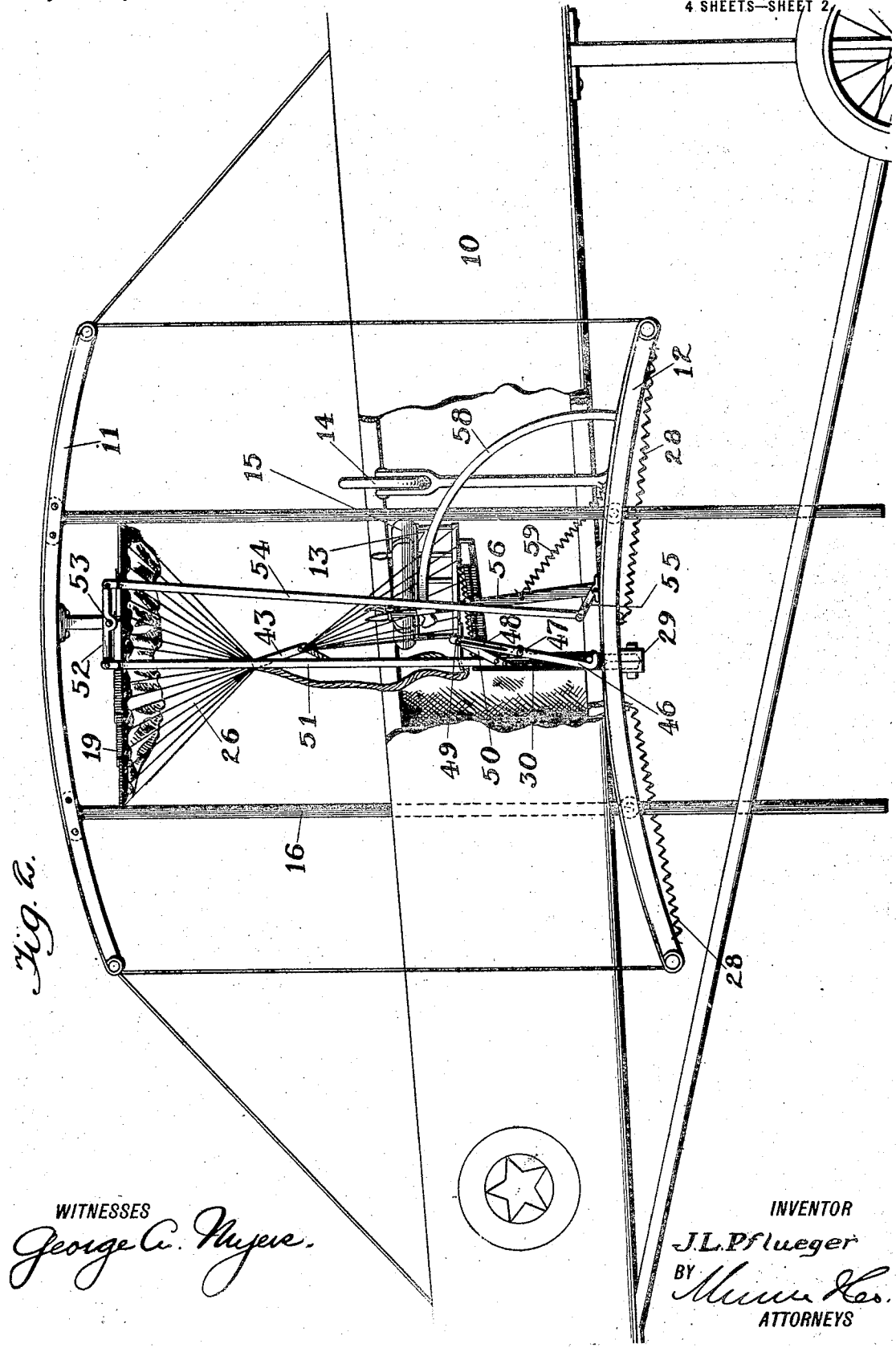

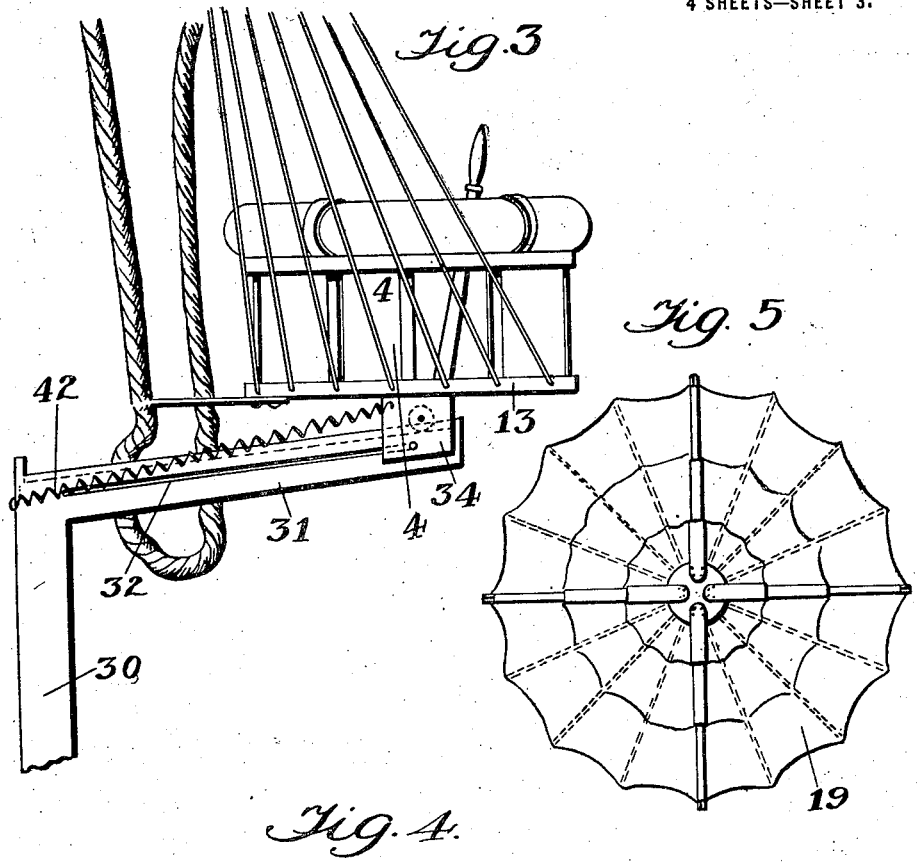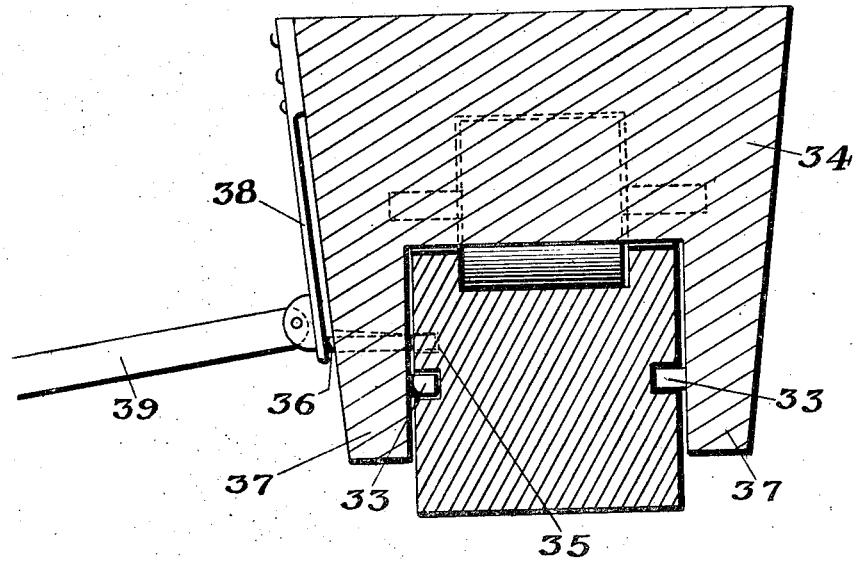

UNITED STATES PATENT OFFICE.

JOHN LOUIS PFLUEGER, OF NEW ORLEANS, LOUISIANA.

PARACHUTE AND LAUNCHING DEVICE FOR AEROPLANES.

1,327,355.   Specification of Letters Patent.   Patented Jan. 6, 1920.

Application filed July 30, 1919. Serial No. 314,275.

*To all whom it may concern:*

Be it known that I, JOHN LOUIS PFLUEGER, a citizen of the United States, and a resident of New Orleans, in the county of Orleans and State of Louisiana, have made certain new and useful Improvements in Parachute and Launching Devices for Aeroplanes, of which the following is a specification.

My present invention relates generally to aeroplanes, and more particularly to safety devices whereby an aviator may, in case of accident, or loss of control, descend in comparative safety apart from the aeroplane itself, and entirely independent thereof, and my primary object is the provision of a parachute and a parachute launching device, the structure of which will enable an aviator to entirely free himself from the aeroplane along with the parachute so as to avoid all danger of fouling the parachute or any part thereof upon the machine structure.

A further object of my invention is the provision of a parachute the structure of which is such as to particularly adapt the same to support in an inoperative position upon an aeroplane, together with means controlled by the aviator whereby the parachute may be withdrawn when desired in a ready free manner.

Further objects and the resulting advantages of my invention will be made plain in the course of the following description in which reference is made to the accompanying drawing forming a part of this specification, and in which:—

Figure 1 is a front elevation of a portion of an aeroplane equipped with my improvements;

Fig. 2 is a side view, a portion of the fuselage being broken away for purposes of better illustration;

Fig. 3 is an enlarged side view of the seat, together with a portion of its support and connections;

Fig. 4 is an enlarged section taken substantially on line 4—4 of Fig. 3;

Fig. 5 is a top plan view of the parachute in extended form;

Fig. 6 is a top plan view of a portion of one of the parachute ribs;

Fig. 7 is a longitudinal section through one of the parachute ribs in collapsed position, and, Fig. 8 is a detail section taken substantially on line 8—8 of Fig. 7.

Referring now to these figures, and particularly to Figs. 1 and 2, I have shown a portion of an aeroplane in which the fuselage appears at 10, and the upper and lower planes at 11 and 12, the operator's seat being shown at 13 within the fuselage 10 in its usual position at the rear of the control 14, and having, in accordance with my present improvements a surrounding life preserver 15 in case descent is made into or on the water.

In accordance with my present improvements, vertical guide beams or tracks 16 are arranged in a series at the corners of a rectangular area within the fuselage 10, the upper ends of which beams are secured to the upper plane 11, and the lower portions of which are secured to the lower plane 12 with extensions depending materially below the lower plane and upon these guide beams are adapted to travel rollers 17, as seen in Figs. 7 and 8, located within the outer ends of the outer sections 18 of the ribs of the parachute generally indicated at 19, and provided with a central support 20, as seen in Fig. 6, from which the several ribs radiate.

While within the space circumscribed by the guide beams 16, the parachute 19 is in collapsed position, the outer sections 18 of its several ribs being telescoped within intermediate sections 21, and the latter in turn telescoped within inner sections 22, the several sections of the ribs being held in such position against the tension of springs 23 and 24 by virtue of latches 25 capable of sustaining the sections in collapsed position against the tension of the springs alone. In this way the parachute may be held in the position shown in Fig. 2, above the aviator's seat 13, to which it is connected by flexible connections 26.

Within the space inclosed by the guide beams 16, the lower plane 12 has hinged doors 27 engaged by springs 28 anchored at one end upon the plane 12 so as to draw the doors downwardly to open position upon the release of a latch which normally acts to hold the doors in closed position. Centrally of their inner free edges, the doors 27 have depending pieces 29 forming a socket for the reception of the lower end of the seat post 30, the latter having an angular forwardly and upwardly inclined upper arm 31 as seen in Fig. 3, provided with longitudinal side grooves 32 receiving inwardly projecting guide pins 33 of a seat block 34 upon which the seat 13 is mounted. Adjacent its forward upper end this arm 31 of the seat post is a side opening 35, and into this opening the inner end of a pin 36 is shiftable through one side 37 of the seat block 34 so as to normally secure the seat 13 in its upper forward position. This latch pin 36 is connected at its outer end to a spring arm 38 in turn connected to one end of a link 39, the opposite end of which is pivoted to the lower end of a lever 40 upstanding at one side of the aviator's seat 13, and fulcrumed upon a bracket 41 so that when the upper end of lever 40 is moved inwardly by the aviator, the link 39 will be shifted to withdraw the latch pin 36 against the tension of the spring 38, thus permitting of movement of the seat block 34 with the seat 13 downwardly and rearwardly along the arm 31 to the upper end of the seat post 30, this movement being assisted by a spring 42, one end of which is secured to the seat block 34 as seen in Fig. 3, and the opposite end of which is anchored upon the upper end of the seat post 30.

The movement of the aviator's seat just above referred to, dependent upon release of the latch pin 36, thus brings the aviator's seat 13 to a position below the parachute 19, the flexible connections 26 being normally held in shortened relation by a clamp 43 which is instantly released when the aviator's seat drops as presently described, and weight is thus thrown upon the connections.

The doors 27 are normally held by latches 44 controlled by a cross-bar 45, passing through the lower portion of the post 30, this cross bar 45 being normally engaged by the lower curved ends of side latch bars 46, as seen in Fig. 2, intermediately fulcrumed as at 47 with upper slotted ends 48 within the slots of which extend pins 49 at the upper ends of angular arms 50 rigidly secured to the lower ends of vertical links 51. These vertical links 51 are connected at their upper ends to one of the ends of cross arms 52, the latter mounted upon a shaft 53 journaled above the uppermost position of the parachute 19, and one of which arms 52 has connected to its opposite end the upper end of a depending link 54. The lower end of the link 54 connects with the rigid angular extension 55 at the lower end of a control lever 56 pivoted upon the plane 12 at one side of the fuselage 10, as seen in Fig. 1, and provided with a latch mechanism 57 normally holding the same at one end of a quadrant bar 58. The lever 56 is engaged by a spring 59 which acts to shift the same along the quadrant bar 58 immediately upon release of the latch mechanism 57 by the aviator, so that the link 54 is thus elevated and shaft 53 is rocked so as to depress the links 51, forcing the pins 49 downwardly within slots 48 in the upper ends of levers 46 and camming these levers upon their fulcrums 47 to release their lower hooks from the rod 45.

This latter action, that is the release of the doors, takes place subsequently to the first described movement of the aviator's seat 13, and results in freeing the doors for downward movement under the tension of the springs 28 to the open position. Immediately upon this action it is obvious that the seat post 30 with the aviator's seat is free to drop, so that the flexible connections 26 will be straightened out and the parachute 19 pulled downwardly along the vertical guide beams 16 until it finally passes off of the lower extremities of these guide beams, and is then entirely free, the air pressure acting with the springs 23 and 24 to force the telescoping sections of the parachute ribs outwardly to the extended operative position of Fig. 5.

Thus as above outlined, my invention not only provides for the ready release of the operator with the parachute, but obviates all danger of fouling of the parachute during release from the aeroplane by virtue of the guided movement it has until well beneath any portions of the aeroplane upon which it might be likely to catch.

In case of loss of control, accident, or where for other reason it is desired to leave the aeroplane, the aviator has simply to operate the levers 40 and 56 in turn as above described, and then drops through the trap doors of the lower plane 12, dragging the parachute free as before described upon the guide beams 16, and my invention thus fulfils a needed want as regards the safety of aviators and provides for the ready opening of the parachute immediately upon its entire release so that descent may be made without danger of accident.

I claim:—

1. The combination of an aeroplane having vertical guide beams, portions of which extend above and below its lower plane, trap doors mounted within the lower plane between the several guide beams, a latch mechanism normally holding the said trap doors in closed position, a lever for releasing said connections, a seat post supported by the said trap doors in closed position, an aviator's seat carried by the seat post, a parachute having telescoping ribs provided with means for engagement with the guide beams when the ribs are collapsed, and connections between the aviator's seat and the said parachute whereby upon the release of the trap doors, the parachute will be carried downwardly along the guide beams with the seat and seat post.

2. The combination of an aeroplane having trap doors in its lowermost plane, said plane provided with vertical guide beams, a collapsible parachute having means to movably engage the said guide beams, an aviator's seat connected with the parachute and normally supported by the said trap doors when the latter are closed, and releasable means normally holding the trap doors in closed position, as described.

3. The combination of an aeroplane having trap doors within its lowermost plane, vertically disposed guide beams portions of which extend above and below the said plane, a collapsible parachute having means to movably engage the said guide bars and normally supported thereby above the said plane, an aviator's seat normally supported by the trap doors in closed position, and connected to the parachute so as to draw the same downwardly on the guide beams when the trap doors are open, and manually operable means for normally securing the doors in closed position, as described.

4. The combination of an aeroplane having trap doors in its lowermost plane, vertical guide beams disposed around the door opening and having portions extending above and below the said plane, a collapsible parachute having ribs in telescoping sections, the ends of the outer sections of which have means to movably engage the said guide beams, said parachute being normally held above the lowermost plane, an operator's seat having a seat post normally stepped in portions of the trap doors and supported thereby in closed position, said seat being connected with the parachute so as to draw the same downwardly therewith when the trap doors are open, connections for normally bolting the trap doors in closed position, and a lever mounted adjacent the operator's seat for releasing the said connections as described.

5. The combination of an aeroplane having a door opening in its lowermost plane, trap doors hinged to the said plane to normally cover the door opening and provided with socket pieces, a seat post stepped into the said socket pieces and normally supported by the doors in closed position, an aviator's seat carried by the seat post, connections normally holding the trap doors in closed position, means including a releasing lever for the said connections, arranged adjacent to the operator's seat, vertical guides disposed around the said door opening and extending above and below the said plane, a collapsible parachute engaged in collapsed position with the said guides, and normally disposed thereon above the operator's seat, and flexible connections between the operator's seat and the said parachute to pull the parachute downwardly free of the guides when the trap doors are open.

JOHN LOUIS PFLUEGER.

Witnesses:
 HENRY A. STONE,
 JOSEPH J. ILLG.